United States Patent Office 3,006,899
Patented Oct. 31, 1961

3,006,899
POLYAMIDES FROM REACTION OF AROMATIC DIACID HALIDE DISSOLVED IN CYCLIC NON-AROMATIC OXYGENATED ORGANIC SOLVENT AND AN AROMATIC DIAMINE
Harold Wayne Hill, Jr., and Stephanie Louise Kwolek, Wilmington, Del., and Paul Winthrop Morgan, West Chester, Pa., assignors to E. I. du Pont de Nemours and Company, Wilmington, Del., a corporation of Delaware
No Drawing. Filed Feb. 28, 1957, Ser. No. 642,941
11 Claims. (Cl. 260—78)

This invention is concerned with a chemical process for preparing polymers and more particularly with a low temperature process for preparing high molecular weight polyamides.

Among the most important synthetic polymers are polyamides. These polymers offer a wide range of desirable physical and chemical properties. Because of their high degree of usefulness, many different methods for preparing polyamides have been studied and several methods have been developed in some detail. Commercially, most polyamides are prepared by melt polymerization techniques involving high temperatures up to 300° C. This process is useful but suffers from certain handicaps. High molecular weight wholly aromatic polyamides having water-white color cannot be prepared by melt polymerization techniques because the high temperatures required for melt polymerizations foster degradation of the intermediates and low molecular weight polymer, by-product formation and cross-linking of polymer chains with resulting discoloration and insolubility.

Low temperature reactions below 100° C. and preferably below 50° C. are desirable for economy and to reduce the chance of degradation and by-product formation. However, when high temperatures are not employed, the reactants themselves must be very reactive in the absence of added heat and use of very reactive materials again produces the problem of by-product formation. For example, diamines and acid halides are the fastest reacting intermediates in the preparation of polyamides but are likewise the most susceptible to hydrolysis and to interaction with a solvent medium. It is the reaction between the acid halide and a solvent medium which presents the most serious problems in utilizing low temperature liquid-phase polymerization reactions; by-product formation interferes with the formation of high molecular weight products.

The process of U.S. 2,708,617 provides one solution to the problem. In this process, acid halide solution does not encounter any coreactive phase until the moment when polymer is formed at an interface of controlled shape and then the contact is only momentary because the polymer is immediately withdrawn. No unreacted acid halide is exposed to water, and thus, hydrolysis is minimized. The system works well with aliphatic intermediates which are extremely fast-reacting (reaction complete in a few seconds), but is unsuitable for producing high molecular weight polyamides from aromatic diamines and aromatic diacid chlorides. An anhydrous system may be used to eliminate hydrolysis, but solvents and acid acceptors required in such systems are more expensive than those involved in an aqueous system.

It would be desirable to utilize a low-temperature polyamidation reaction in which hydrolysis does not impede the formatiton of a high molecular weight product, and in which solvents could be employed which are more accessible than those used in one-phase polymerizations. Such a process would be particularly desirable for the preparation of polyamides from aromatic intermediates. Aromatic diamines and aromatic diacid chlorides are slower reacting and, therefore, the hydrolysis problem is accentuated. Moreover, aromatic polyamides are less soluble, and low temperature polymerizations cannot always be prolonged until high molecular weight polymers are obtained.

It is an object of this invention to provide a low temperature aqueous process for the preparation of polyamides from aromatic amines and aromatic acid halides.

It is a further object to provide a process for preparing novel polyamides having properties not heretofore realized.

It is another object to prepare high molecular weight wholly aromatic film and fiber-forming polyamides in an aqueous system at room temperatures using inexpensive solvents and cheap inorganic acid acceptors.

In accordance with the process of this invention, an aromatic diamine is reacted with an aromatic diacid chloride in an aqueous system to produce a high molecular weight film- and fiber-forming wholly aromatic polyamide. The amine groups in the aromatic diamine and the acid chloride groups in the diacid chloride must be attached directly to non-adjacent carbon atoms in aromatic rings. The reaction is carried out by agitating an aqueous solution of the diamine with a solution of the diacid chloride in a cyclic non-aromatic oxygenated organic solvent of the group cyclic tetramethylene sulfone, 2,4-dimethyl cyclic tetramethylene sulfone, tetrahydrofurane, propylene oxide, and cyclohexanone, the agitation being sufficiently vigorous to produce visual turbulence.

The reaction proceeds very rapidly and is usually complete within about one minute. In order to ensure complete reaction, however, several minutes are usually allowed, but a reaction time in excess of ten minutes is almost always unnecessary. Equimolar amounts of diamine and diacid chloride are utilized, and each of these reactants is preferably present in solution at the beginning of the reaction in an amount between about 3% and about 30% by weight based upon the weights of aqueous and organic solvent solutions respectively. Solution concentrations as low as about 1% and as high as about 50% may be utilized, if desired.

The reaction is conducted in the presence of an acid acceptor which is preferably an inorganic alkaline material such as sodium carbonate, potassium carbonate, or the like. Organic acid acceptors such as triethylamine may also be used. The acid acceptor is employed in an amount slightly in excess of the theoretical quantity required to neutralize any acid formed during the reaction. Preferably, the quantity of acid acceptor will not exceed more than a 100% excess based on this thoretical amount.

In accordance with the present invention, there is provided a high molecular weight polymer characterized predominantly by the structural unit

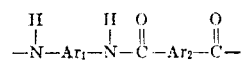

wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, sulfonyl nitro, lower carbalkoxy, or other groups which do no form a polyamide during polymerization.

The high molecular weight polymer of this invention is termed "an aromatic polyamide." This term refers to a polymer wherein repeating units are linked by a carbonamide group, i.e., the

radical, the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. The term "aromatic ring" means a carbocyclic ring possessing resonance. Exemplary aromatic radicals have the following structural formulas

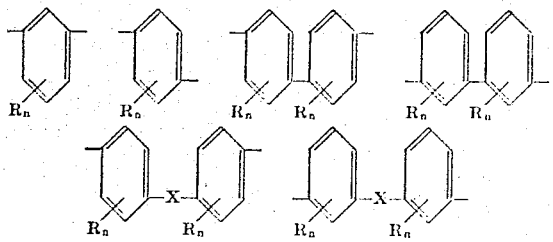

in which R is preferably a lower alkyl, lower alkoxy, or halogen group, n is a number from 0–4, inclusive, and X is preferably one of the groups of

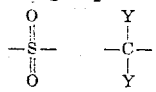

and —O—, in which Y is a hydrogen or a lower alkyl group. X may also be a lower alkylene or lower alkylene dioxy group although these are somewhat less desirable. R may also be a nitro, lower carbalkoxy, or other non-polyamide-forming group. All of these aromatic radicals are divalent and meta or para oriented, that is, the unsatisfied bonds of the radicals (the "chain-extending bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. Preferable, however, are high molecular weight polymers in which the aromatic radicals are unsubstituted or contain only lower alkyl groups attached to any one ring. The term "non-polyamide-forming groups" refers to groups which do not form polyamides during the polymerization reaction herein disclosed.

High molecular weight polymers of this invention are prepared by reacting an aromatic di-acid chloride with an aromatic diamine, the acid groups of the di-acid chloride and the amine groups of the diamine being meta or para oriented relative to each other, at low temperatures (below 100° C.).

The di-acid chloride of the dibasic aromatic acid useful as a reactant in the polymerization of the present invention includes compounds of the formula

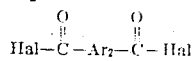

wherein $Ar_2$ is a divalent aromatic radical, i.e., it contains resonant unsaturation, and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing less than five carbon atoms.

Di-acid chlorides which may be utilized to prepare the polyamides of this invention include isophthaloyl chloride and lower alkyl isophthaloyl chlorides such as methyl-, ethyl-, propyl-, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. The total number of carbon atoms in the substituents attached to the aromatic ring should not exceed nine. It is not necessary that all of the alkyl substituent groups be the same because compounds such as 2-methyl-4-ethyl isophthaloyl chloride and 2-methyl-4-ethyl-5-propyl isophthaloyl chloride may be utilized, the total number of carbon atoms in all the substituent groups (non-polyamide-forming groups) attached to the aromatic ring in the latter two compounds being 3 and 6, respectively. In place of an alkyl group, the aromatic ring in isophthaloyl chloride may be substituted with one or more lower alkoxy groups such as, for example, methoxy-, ethoxy-, propoxy-, butoxy-, etc., isophthaloyl chlorides. As with alkyl-substituted isophthaloyl chlorides it is desirable that the total number of carbon atoms in the alkoxy groups attached to the aromatic ring be less than about five, but it is not necessary that all of the alkoxy groups be the same. Representative of such compounds are dimethoxy-, trimethoxy-, tetramethoxy-, and diethoxy-isophthaloyl chlorides, and 2-methoxy-4-ethoxy isophthaloyl chloride. Halogen-substituted isophthaloyl chlorides as exemplified by chloro-, bromo-, and fluoro-isophthaloyl chlorides may be used. More than one halogen may be attached to the aromatic ring and di-halo isophthaloyl chlorides, such as dichloro-, dibromo-, difluoro-, or chlorobromo-, chlorofluoro-isophthaloyl chlorides are useful as are similar tri-halo and tetra-halo isophthaloyl chlorides. The halogens in these compounds may be the same or different as in the case of the di-halo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups so long as the total number of carbon atoms in the substituents attached to the aromatic ring does not exceed nine. Thus, it will be apparent that the aromatic radical of the isophthaloyl chloride may contain one or more or any combination of lower alkyl, lower alkoxy, halogen, nitro, phenyl, lower carbalkoxy, or other non-polyamide-forming groups.

In addition to isophthaloyl chlorides and substituted isophthaloyl chlorides specified above, corresponding unsubstituted and substituted terephthaloyl chloride may also be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed nine. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc., terephthaloyl chlorides, chloro-, bromo-, dichloro-, chlorobromo-, etc., terephthaloyl chlorides, and nitro and lower carbalkoxy-terephthaloyl chlorides.

In addition to the single ring diacid chlorides specified above, multiple ring diacid chlorides in which the acid chloride groups are oriented meta or para with respect to each other are also useful in this invention. Exemplary of such compounds are 4,4'-oxydibenzoyl chloride, 4,4'-sulfonyldibenzoyl chloride, 4,4'-dibenzoyl chloride, 3,3'-oxydibenzoyl chloride, 3,3'-sulfonyldibenzoyl chloride, and 3,3'-dibenzoyl chloride, the corresponding bromides and fluorides, and similar compounds in which one or both of the aromatic rings contains one or more or a combination of lower alkyl, lower alkoxy, halogen, nitro, sulfonyl, lower carbalkoxy groups.

The diamines useful as reactants in forming the polymer of this invention are compounds of the formula $H_2N—Ar_1—NH_2$ wherein $Ar_1$ is a divalent aromatic radical as defined above and the $NH_2$ groups are oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy as mentioned above. The aromatic nucleus of the diamines may be identical to any of the aromatic radicals mentioned above for the diacid chlorides, and the diamine utilized in any given instance may contain the same or different aromatic radical as the diacid chloride utilized. The total number of carbon atoms in the substituent groups attached to any aromatic ring should not exceed nine.

Exemplary diamines which may be utilized in this invention include meta-phenylene diamine and lower alkyl substituted meta-phenylene diamine such as methyl-, ethyl-, propyl-, etc., meta-phenylene diamine. There may be more than one alkyl group attached to the aromatic ring as in the case of dimethyl, trimethyl, tetramethyl, diethyl, triethyl, and triisopropyl meta-phenylene diamine. The alkyl substituent groups need not be the same because compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy-, ethoxy-, propoxy-, butoxy-, etc., meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenylene diamine as exemplified by chloro, bromo, and fluoro meta-phenylene diamine may be utilized. More than one halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups so long as the total number of carbon atoms in the substituents attached to an aromatic ring does not exceed nine.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring so long as the total number of carbon atoms in all substituents attached to an aromatic ring does not exceed nine.

In addition to the single ring aromatic diamines specified above, multiple or fused ring aromatic diamines in which the amino groups are oriented meta or para with respect to each other are also useful in this invention. Exemplary of such compounds are 4,4'-oxydiphenyldiamine, 4,4' - sulfonyldiphenyldiamine, 4,4' - diphenyldiamine, 3,3'-oxydiphenyldiamine, 3,3' - sulfonyldiphenyldiamine, and 3,3'-diphenyldiamine, and the corresponding compounds in which one or both of the aromatic rings contains one or more or a combination of lower alkyl, lower alkoxy, halogen, nitro, sulfonyl, lower carbalkoxy groups and the total number of carbon atoms in the substituent groups attached to an aromatic ring does not exceed nine.

A diamine and diacid chloride are reacted in accordance with this invention to produce a high molecular weight linear polyamide having a structural unit corresponding to the diamine and diacid chloride utilized. For example, para-phenylenediamine reacts with isophthaloyl chloride to produce a polymer characterized by the following structural unit

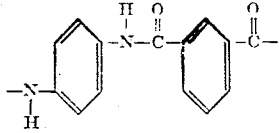

and having an inherent viscosity greater than about 0.6. Similarly, other diamines and diacid chlorides react to produce polyamides with corresponding aromatic nuclei. The structure of the polyamide is indicated by the fact that in accordance with this invention two aromatic bifunctional reactants (aromatic diacid halide and aromatic diamine) combine in equivalent amounts under very mild reaction conditions to form a polymer that is dissolved and unchanged in unreactive solvents, and is orientable and generally crystallizable in film and fiber form. The structure of the polymer is confirmed by infra red spectra analysis.

In preparing the polymers of this invention two or more aromatic diamines or two or more aromatic diacid compounds of the structures already described can be employed in place of a single diamine and single dibasic acid compound. In addition, up to about 10% polymer-forming ingredients which may or may not contain an aromatic nucleus can be included without seriously detracting from the extraordinary physical and chemical properties of the polymers of this invention. Preferably, however, the diamine and diacid compounds utilized will be wholly aromatic, thus resulting in a polymer characterized entirely by structural units with all of the nuclei containing aromatic radicals.

Polymers of this invention are characterized by an exceptionally high melting point. Whereas known polyamides melt at temperatures below about 270° C., generally the polyamides of this invention have melting points in excess of 300° C. and in many instances above 350° C. Moreover, filaments of polyamides of this invention retain their filament form at temperatures of about 300° C. Polymers of this invention are also distinguished from known polyamides in having water-white color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures and are readily crystallizable.

The polymers of this invention find application in a wide variety of physical shapes and forms. Among the most significant of these forms are fibers and films. The useful combination of desirable physical and chemical characteristics of these polymers are unique. Fibers and films of these polymers not only possess excellent physical properties at room temperatures, but retain their strength and excellent response to work-loading at elevated temperatures for prolonged periods of time. Behavior of this type offers commercial utility in a wide range of end uses. In fiber form the polymers offer possibilities for high temperature electric insulation, protective clothing and curtains, filtration media, packing and gasketing materials, brake linings and clutch facings. In the aircraft industry these materials can be used in parachutes, fuel cells, tires, ducts, hoses and insulation. In atomic energy applications the remarkable resistance to radiation with retention of physical properties as well as thermal stability is important. Cordage for tires and conveyor belts, particularly where such materials would be subject to prolonged high temperature exposure is another application. Press cloths in the dry cleaning industry prepared from such fibers have extreme hydrolytic stability. In the form of films, these polymers may be used in automotive and aviation interior head lining materials, decorative trim, high temperature electrical insulation, such as for slot liners, use in dry transformers, capacitors, cable wrappings, etc., packaging of items to be exposed to high temperature or high energy radiation while within the package, corrosion resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets or foils, mold liners or self-sustaining containers for casting low-melting (below 300° C.) fusible materials, including metals, and a variety of other similar and related uses.

Films formed from polymers of this invention may be stretched or otherwise oriented according to conventional procedures. Films may be oriented biaxially by stretching or rolling in both directions or by rolling in one direction and stretching in the other.

The following examples illustrate the invention. All parts and percentages are by weight unless otherwise indicated. Values of inherent viscosity are determined in sulfuric acid (sp. gr. 1.1841 at 60° F.), at 30° C. at a concentration of 0.5 gram polymer per 100 cc. of solution. All polymers of this invention have an inherent viscosity of at least about 0.6 on this basis and a melting point of at least about 300° C.

EXAMPLE I 2.554 parts of 4,6-meta-xylenediamine and 3.975 parts of sodium carbonate are dissolved in 100 parts of water. A separate solution of 3.807 parts of isophthaloyl chloride in 136 parts of 3,4-dimethyl tetramethylene sulfone is prepared. The diamine solution is placed in a Waring Blendor and is agitated rapidly. The acid chloride solution is then added and stirring is continued for 5 minutes. The reaction takes place at room temperature and at the end of the reaction time, the polymer is precipitated by the addition of water. Filtered and washed polymer is obtained in a yield which is 78.6% of theoretical, and the polymer has an inherent viscosity of 0.81. Melting point of the polymer is 352° C.

EXAMPLE II

The procedure of Example I is followed except that instead of isophthaloyl chloride the acidic ingredient is terephthaloyl chloride. Proportions of reactants and of solvents are the same as described above. The reaction takes place in a Waring Blendor and at the end of 5 minutes the reaction is stopped by the addition of water. The polymer is precipitated and obtained with an inherent viscosity of 0.72, and a melting point of 365° C.

EXAMPLE III

A solution of 6.1 parts of 2,4-diamino toluene in 200 parts of water and 44.4 parts of tetrahydrofuran is placed in a Waring Blendor. To this stirred solution is added a solution of 10.2 parts of terephthaloyl chloride in 147 parts of tetrahydrofuran. An equivalent amount of sodium carbonate is added to the diamine solution prior to reaction. At the end of 10 minutes the reaction is stopped, and the polymer is separated by filtration. The polymer is obtained in a yield which is 100% of theoretical and is found to have an inherent viscosity of 1.37. The polymer has a stick temperature of 305° C. Fibers are spun from a 15% solution of polymer in dimethylacetamide containing 5% lithium chloride. The tenacity of these fibers is 1.4 g.p.d. with an elongation of 96% at the break and an initial modulus of 32.

EXAMPLE IV

A solution is prepared containing 9.7 parts of 2,5-diaminotoluene dihydrochloride and 21.2 parts sodium carbonate acid acceptor in 150 parts of water. This aqueous solution is placed in a Waring Blendor and rapid agitation is started. A separate solution of 10.1 parts of isophthaloyl chloride in 155 parts of tetrahydrofuran is prepared and added to the rapidly stirred diamine solution. The reaction is allowed to continue for 10 minutes at the end of which time stirring is stopped and the polymer completely precipitated by the addition of an extra 100 parts of water. The polymer, after drying, is found to have an inherent viscosity of .67 and a melting point of 350° C. Yield of polymer is 98% of the theoretical.

EXAMPLE V

A solution of 10.6 parts of 3,3'-dimethyl benzidine in 300 parts of water and 66.6 parts of tetrahydrofuran containing 10.6 parts of sodium carbonate is prepared. This solution is placed in a Waring Blendor and stirred rapidly. A solution of 10.1 parts of isophthaloyl chloride in 222 parts of tetrahydrofuran is added and agitation is continued for 10 minutes. At the end of this time the polymer is separated and washed. The dried polymer has an inherent viscosity in sulfuric acid of 1.70 and a melting point 365° C. Yield of polymer is 98% of the theoretical.

EXAMPLE VI

A solution of 5.95 parts of bis(4-aminophenyl)methane in 150 parts of water and 111 parts of tetrahydrofuran with 6.36 parts of sodium carbonate is prepared. This solution is rapidly agitated in a Waring Blendor and a solution of 6.06 parts of isophthaloyl chloride in 44.4 parts of tetrahydrofuran added. Agitation is continued for 10 minutes and at the end of that time polymer is separated and found to have an inherent viscosity of 1.86 and a melting point 350° C. The polymer is obtained in a 97% yield.

EXAMPLE VII

Meta-phenylenediamine in the amount of 5.4 parts is dissolved in 150 parts of water containing 10.6 parts of sodium carbonate. This solution is placed in a Waring Blendor and agitated while a solution of 10.2 parts of isophthaloyl chloride in 344 parts of propylene oxide is added. Agitation is continued for 10 minutes. The resulting polymer is washed, filtered, and dried, and is found to have been obtained in a yield which is 98% of theoretical. Polymer viscosity is 0.72.

EXAMPLE VIII

In a Waring Blendor 27.12 parts of 2,2'-di(4-aminophenyl)propane and 25.44 parts of sodium carbonate are mixed in 240 parts of water and 266 parts of tetrahydrofuran. This mixture is rapidly stirred while 24.36 parts of isophthaloyl chloride in 266 parts of tetrahydrofuran is added as quickly as possible. A thick emulsion results which is stirred for 7 minutes then transferred to a larger Waring Blendor. With rapid stirring, 1200 parts of water are added to break the emulsion and precipitate the polymer which appears in a fine easily filtered state. The polymer is washed three times with water and dried overnight at 75° C. in a vacuum oven. Polymer obtained is in 95% yield. Polymer viscosity is 1.2 measured in meta-cresol at 0.5% concentration. This polymer, when dissolved in a mixture of 90 parts of tetrahydrofuran and 10 parts of water, gives a solution having a solid content of about 24%, from which fibers can be spun; melting point 375° C.

EXAMPLE IX

In a standard Waring Blendor, 27.12 parts of 2,2'-di(4-aminophenyl)propane and 25.44 parts of sodium carbonate are mixed in 266 parts of tetrahydrofuran and 240 parts of water. This mixture is rapidly stirred while 24.36 parts of terephthaloyl chloride in 266 parts of tetrahydrofuran are added as rapidly as possible. A thick emulsion is obtained which is stirred for 6 minutes and then transferred to a larger Waring Blendor where additional water is added to precipitate the polymer. The polymer, after washing and drying, is obtained in 95% yield and has an inherent viscosity measured in meta-cresol of 1.8. The polymer obtained is dissolved in dimethylformamide to a concentration of 14% solids and from this solution a yarn can be spun. Yarns of this polymer, drawn to twice their original length in an atmosphere of steam at 30 lbs. pressure, have a tenacity of 3.6 g.p.d. with an elongation at the break of 28%.

EXAMPLE X

A solution of 5.41 parts of m-phenylenediamine and 10.6 parts of sodium carbonate in 150 parts of water is placed in a Waring Blendor and a solution of 10.26 parts of isophthaloyl chloride in 155 parts of tetrahydrofuran added rapidly with moderate stirring. Agitation is continued for 10 minutes and the polymer is then separated by filtration, washed three times with water in a Waring Blendor, and dried. Poly(m-phenylene isophthalamide) is obtained in a yield equal to 94% of the theoretical based upon the starting materials and has an inherent viscosity of 2.47. The polymer is dissolved in a solution of 5% lithium chloride in dimethylformamide to give a water-white viscous solution containing approximately 20% polymer, and suitable for spinning into fibers.

EXAMPLE XI

Poly(m-phenylene isophthalamide) prepared as described in Example X from a polymerization reaction using tetrahydrofuran and water as solvents is obtained with inherent viscosity of 1.65. This polymer is dissolved in a mixture of dimethylformamide and lithium chloride, giving a solution which contained 24.4% solids and 23.5% lithium chloride based on the polymer. The polymer solution is dry spun through a 10-hole spinneret, in which each hole has a diameter of 0.005 inch, into an air column held at 200 to 210° C. and the resulting yarn is wound up at a speed of 135 yds. per min. Spinnability is good. The yarn is drawn 5.5× its original length in an atmosphere of steam at 56 lbs. pressure, after first being extracted with cold water for 64 hours. The resulting yarn has a tenacity of 3.6 g.p.d., an elongation of 23% at the break, and an initial modulus of 70 g.p.d. Fiber stick temperature is 305° C. On being exposed to air held at 175° C. containing 5% water, this yarn retains 56% of its tenacity after 192 hours of exposure.

EXAMPLE XII 3.244 parts of meta-phenylenediamine and 6.36 parts of sodium carbonate are dissolved in 90 parts of water, and this solution placed in a Waring Blendor and vigorously agitated. To this solution is added a solution of 6.09 parts of isophthaloyl chloride in 109 parts of 3,4-dimethylcyclic tetramethylene sulfone. The acid chloride solution is poured into the diamine solution and stirred for five minutes. Water is then added to precipitate the polymer, the resultant suspension filtered and the polymer washed with water. The product, obtained in 100% yield, has an inherent viscosity of 2.42. The polymer, as obtained in the washed and dried form, is easily soluble in a mixture of 5% lithium chloride in dimethylformamide. 20% by weight of the polymer is dissolved, and this solution is spun to give fibers which can be drawn 5× their original length in steam. The fibers have a tenacity of better than 4 g.p.d. These fibers have excellent high temperature stability, chemical resistance, and hydrolytic stability as described hereinafter.

EXAMPLE XIII

A solution of 18.3 parts of potassium carbonate in 166 parts of water is used to dissolve 3.24 parts of meta-phenylenediamine. To this is added 314 parts of cyclic tetramethylene sulfone. This mixture is placed in a Waring Blendor and agitated to form an emulsion. To the rapidly stirred emulsion is added a solution of 6.05 parts of isophthaloyl chloride dissolved in 94 parts of cyclic tetramethylene sulfone. The polymerization reaction started immediately. After ten minutes, poly(meta-phenylene isophthalamide) is separated by filtration, washed, and dried. The polymer is found to have an inherent viscosity of 0.59.

EXAMPLE XIV

A polyamide from meta-phenylenediamine and isophthaloyl chloride is prepared as follows: 4.24 parts of sodium carbonate, 2.162 parts of meta-phenylenediamine, 50 parts of water and 47.5 parts of cyclohexanone are placed in a Waring Blendor. To this mixture is added, with rapid stirring, 4.06 parts of isophthaloyl chloride in 28.5 parts of cyclohexanone. An additional 19 parts of cyclohexanone are used to rinse the vessel containing acid chloride into the reaction mixture. The mixture is stirred for 8 minutes and then an equal volume of hexane is added. The resulting precipitate is collected and washed to produce 4.8 parts of poly(meta-phenylene isophthalamide). This polymer has an inherent viscosity of 1.12 and a melting point of 385° C.

EXAMPLE XV

Poly(4,6-methyl-m-phenylene isophthalamide) is prepared by placing 2.724 parts of 4.6 diamino-m-xylene, 2.544 parts of sodium carbonate and 124 parts of water in a Waring Blendor. To this mixture is added with rapid stirring a solution of 4.061 parts of isophthaloyl chloride in 131 parts of 2,4-dimethyltetramethylene sulfone. The mixture is stirred for 5 minutes and water is then added to precipitate the polymer. 5.5 parts of the washed polymer having an inherent viscosity of 1.25 is collected.

EXAMPLE XVI

Poly(meta-phenylene isophthalamide) prepared as in Example XII is dissolved to a concentration of 17% in a mixture of 95 parts dimethylformamide and 5 parts lithium chloride. This solution at 128° C. is spun through a 5-hole (0.10 mm. diameter) spinneret (orifice diameter of 0.10 mm.) into an air column maintained at 225° C. Fiber, wound up at the rate of 92 yards per minute is thereafter drawn to approximately 4.75 times its original length and boiled off in water. The final fiber has a tenacity of 4.9 grams per denier, with a 30% elongation at the break.

Another sample of the same polymer is dissolved in a mixture of 95% dimethylformamide and 5% lithium chloride to give a 15% polymer solution. This solution is cast into a film. The solvent is flashed off in a hot oven at 150° C. The resulting film is leached in hot water to remove residual dimethylformamide and salt. Test strips of the wet film are clamped in frames prior to drying in a vacuum. Physical properties of the films at various temperatures are reported in the table below:

*Table 1*

| Temperature, ° C. | Tensile strength (p.s.i.) | Modulus (p.s.i.) | Percent elongation |
| --- | --- | --- | --- |
| 20 | 12,000 | 500,000 | 3-5 |
| 150 | 7,500 | 350,000 | 5-10 |
| 200 | 7,000 | 350,000 | 8-15 |

The film is also noted to have a high dielectric constant which drops off only fractionally at temperatures as high as 200° C., while commercially available insulating materials such as polyethylene or rubber are either completely destroyed or become molten at such temperatures.

In order to illustrate the non-flammable nature of the polymers, a sample of fiber such as prepared above is subjected to a standard flammability test (A.A.T.C. 45° angle test, American Handbook of Synthetic Textiles, 1st ed. (1952), Textile Book Publishers Inc., N.Y.), along with a cotton fiber control. Both fibers are knit into tubes and exposed to an open flame until ignited, at which time the flame is removed. Test results are shown in the table below:

Table 2
FLAMMABILITY OF KNIT FABRICS

| Sample | Ignition time, sec. | Total time to burn, sec. | Dimensions char zone (inches) | Type of burning | Type of residue |
|---|---|---|---|---|---|
| Fiber of Ex. I (5 samples) | 3.8 | Went out, 5.4 | 0.35 x 0.30 | Slow ignition, negligible burning period. | Crusty, hard. |
| Cotton fiber (5 samples) | 2 | 13 to 430 | 1.5 x 6 sample burned completely | Rapid ignition, quick flaming, glowing char slowly disentegrates. | Feathery. |

As can be seen, the fiber of this invention is outstandingly superior to cotton in flame resistance. In similar tests, the fibers of this invention were compared to other commercial synthetic fibers, and proved more difficult to ignite and in addition were self-extinguishing. A sample of a fabric from poly(hexamethylene adipamide) yarn was burned to the extent of ⅔ of the fabric area, while the fabric prepared from fibers of Example I was charred for less than ¹⁄₁₀ of its area.

Another sample of the same polymer is dissolved in a mixture of 80.75 parts of dimethylformamide and 4.25 parts lithium chloride to give a 15% polymer solution. This solution is cast into a film using a doctor blade allowing 15 mils clearance. Solvent is flashed off in a hot vacuum oven. Resulting film is oriented by hot-rolling in a direction perpendicular to the direction of casting and then hot-rolled at a 90° angle to that direction, producing a biaxially oriented film. Physical properties of this film are shown in Table 3 below.

Table 3

| | Direction of first rolling | Direction of second rolling |
|---|---|---|
| Modulus, lbs./in | 960,000 | 700,000 |
| Tenacity, lbs./in | 30,000 | 22,000 |
| Elongation, percent | 10 | 4.5 |

EXAMPLE XVII

Poly(4-methyl-m-phenylene isophthalamide), prepared by reacting 4-methyl-m-phenylenediamine with isophthaloyl chloride by the procedure of Example XII, is water-white in color. This polymer, which has an inherent viscosity of 1.64 and a melting point above 300° C., is dry spun from a dimethylformamide solution and the resulting yarn is drawn three times its original length. Samples of this yarn together with comparative controls are exposed, for various periods, to (A) air at 175° C. containing 5% steam, and (B) air at 175° C. containing 5% steam and 5% sulfur dioxide. Tenacities of the samples A and B are reported in Tables 4 and 5, respectively.

Table 4

| Yarn | Exposure time (days) | Retained tenacity (percent) |
|---|---|---|
| Poly(m-phenylene isophthalamide) | 6 | 85 |
| Poly(methyl-m-phenylene isophthalamide) | 6 | 45 |
| Poly(ethylene terephthalate) | 6 | 19 |
| Poly(hexamethylene adipamide) | 4 | (¹) |

¹ Too weak to test.

Table 5

| Yarn | Exposure time (days) | Retained tenacity (percent) |
|---|---|---|
| Poly(m-phenylene isophthalamide) | 6 | 70 |
| Poly(methyl-m-phenylene isophthalamide) | 3 | 19 |
| Poly(ethylene terephthalate) | 1 | (¹) |
| Poly(hexamethylene adipamide) | 1 | (¹) |

¹ Too weak to test.

The claimed invention:
1. A process for preparing a high molecular weight wholly aromatic polyamide comprising reacting an aromatic diamine with an equimolar amount of aromatic diacid halide, the amine groups in the aromatic diamine and the acid halide groups in the aromatic diacid halide being attached directly to non-adjacent carbon atoms in aromatic rings, using the aromatic diamine in aqueous solution and the aromatic diacid halide dissolved in a cyclic non-aromatic oxygenated organic solvent of the group consisting of cyclic tetramethylene sulfone, 2,4-dimethyl cyclic tetramethylene sulfone, tetrahydrofuran, propylene oxide, and cyclohexanone, the reaction being carried out by agitating the aqueous aromatic diamine with the solution of aromatic diacid halide to produce visible turbulence at a temperature below 100° C. in the presence of an acid acceptor to produce a polyamide having an inherent viscosity of at least 0.6 when determined in solution in concentrated sulfuric acid at 30° C. at a concentration of 0.5 gram of polymer per 100 cubic centimeters of solution.

2. The process of claim 1 in which the acid acceptor is an inorganic compound.

3. The process of claim 1 in which the acid acceptor is sodium carbonate.

4. The process of claim 3 in which the solvent is tetrahydrofuran.

5. The process of claim 3 in which the diamine is metaphenylene diamine and the diacid halide is isophthaloyl chloride.

6. A process comprising dissolving in water an inorganic acid acceptor and an aromatic diamine in which the amine groups are attached directly to non-adjacent carbon atoms in an aromatic ring, adding to the aqueous diamine solution a solution in a water-miscible organic solvent of an aromatic diacid chloride in which the acid chloride groups are attached directly to non-adjacent carbon atoms in an aromatic ring, the aromatic diacid chloride being in an amount substantially equimolar to that of the aromatic diamine and the organic solvent being of the group consisting of cyclic tetramethylene sulfone, 2,4-dimethyl cyclic tetramethylene sulfone, tetrahydrofuran, propylene oxide and cyclohexanone, agitating the mixture of the two solutions to produce visible turbulence at a temperature below about 50° C. and recovering from the reaction product mixture a high molecular weight aromatic polyamide characterized by the structural unit

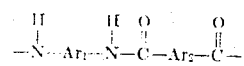

wherein $Ar_1$ and $Ar_2$ correspond to the aromatic radicals of the diamine and diacid chloride respectively, said polymer having an inherent viscosity of at least 0.6 when determined at a concentration of 0.5 gram of polymer per 100 cubic centimeters of solution in concentrated sulfuric acid at 30° C.

7. The process of claim 6 in which the diamine is metaphenylene diamine and the diacid chloride isisophthaloyl chloride.

8. The process of claim 6 in which the acid acceptor is sodium carbonate.

9. The process of claim 8 in which the solvent is tetrahydrofuran.

10. A process comprising reacting an aromatic diamine with an equimolar amount of aromatic diacid chloride, the amine groups in the aromatic diamine and the acid chloride groups in the aromatic diacid chloride being attached directly to non-adjacent carbon atoms in aromatic rings, the aromatic diamine being uniformly distributed in an aqueous medium and the aromatic diacid chloride being dissolved in a cyclic non-aromatic oxygenated organic solvent miscible with the aqueous medium of the group consisting of cyclic tetramethylene sulfone, 2,4-dimethyl cyclic tetramethylene sulfone, tetrahydrofuran, propylene oxide, and cyclohexanone, the reaction being carried out by agitating the aqueous aromatic diamine with the solution of aromatic diacid halide to produce visible turbulence at a temperature below 100° C. in the presence of an acid acceptor, to produce a high molecular weight wholly aromatic polyamide having an inherent viscosity of at least 0.6 when determined at a concentration of 0.5 gram per 100 cubic centimeters of solution in concentrated sulfuric acid at 30° C. and a melting point above about 300° C. and forming said polyamide into a shaped article.

11. A process comprising reacting an aromatic diamine with an equimolar amount of aromatic diacid chloride, the amine groups in the aromatic diamine and the acid chloride groups in the aromatic diacid chloride being attached directly to non-adjacent carbon atoms in aromatic rings, the aromatic diamine being uniformly distributed in an aqueous medium and the aromatic diacid chloride being dissolved in a cyclic non-aromatic oxygenated organic solvent miscible with the aqueous medium of the group consisting of cyclic tetramethylene sulfone, 2,4-dimethyl cyclic tetramethylene sulfone, tetrahydrofuran, propylene oxide, and cyclohexanone, the reaction being carried out by agitating the aqueous aromatic diamine with the solution of aromatic diacid halide to produce visible turbulence at a temperature below 100° C. in the presence of an acid acceptor, to produce a high molecular weight wholly aromatic polyamide having an inherent viscosity of at least 0.6 when determined at a concentration of 0.5 gram per 100 cubic centimeters of solution in concentrated sulfuric acid at 30° C. and a melting point above about 300° C., forming said polyamide into a shaped article, and orienting the shaped article by stretching.

References Cited in the file of this patent

UNITED STATES PATENTS

| | | |
|---|---|---|
| 2,130,948 | Carothers | Sept. 20, 1938 |
| 2,244,192 | Flory | June 3, 1941 |
| 2,404,722 | Houtz | July 23, 1946 |
| 2,708,617 | Magat et al. | May 17, 1955 |
| 2,813,776 | Koller | Nov. 19, 1957 |
| 2,831,834 | Magat | Apr. 22, 1958 |

FOREIGN PATENTS

| | | |
|---|---|---|
| 614,625 | Great Britain | Dec. 20, 1948 |